United States Patent
Chang et al.

(10) Patent No.: US 10,243,832 B2
(45) Date of Patent: Mar. 26, 2019

(54) ROUTING MESSAGE DELIVERY METHOD APPLICABLE TO NETWORK NODE AND NETWORK NODE USING THE SAME AND COMMUNICATION NETWORK USING THE SAME

(71) Applicant: Industrial Technology Research Institute, Hsinchu (TW)

(72) Inventors: Hsien-Wen Chang, Hsinchu (TW); Jen-Shun Yang, Hsinchu County (TW); Yen-Chang Chiu, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 801 days.

(21) Appl. No.: 14/582,106

(22) Filed: Dec. 23, 2014

(65) Prior Publication Data

US 2016/0182365 A1 Jun. 23, 2016

(51) Int. Cl.
*H04L 12/717* (2013.01)
*H04L 12/741* (2013.01)
(Continued)

(52) U.S. Cl.
CPC ............ *H04L 45/02* (2013.01); *H04L 45/021* (2013.01); *H04W 84/18* (2013.01)

(58) Field of Classification Search
CPC ......... H04L 45/00; H04L 41/12; H04L 45/26; H04L 45/20; H04L 43/106; H04L 45/02; H04L 45/48; H04L 1/188; H04L 45/123
See application file for complete search history.

(56) References Cited

U.S. PATENT DOCUMENTS 6,785,226 B1   8/2004 Oltman et al.
7,453,864 B2   11/2008 Kennedy et al.
(Continued)

FOREIGN PATENT DOCUMENTS

CN   1961541    5/2007
CN   102271379   12/2011
(Continued)

OTHER PUBLICATIONS

Johnson et al., "Dynamic source routing in ad hoc wireless networks," Mobile Computing, 1996, pp. 1-18.
(Continued)

*Primary Examiner* — Romani Ohri
(74) *Attorney, Agent, or Firm* — JCIPRNET

(57) ABSTRACT

The disclosure proposes a routing message delivery method, a relay node using the same method, and a communication network using the same method. According to one of the exemplary embodiments, the proposed routing message delivery method would include at least but not limited to initiating a timer having a first timer value that is a non-zero positive number, forwarding a first routing message via a first path in response to receiving the first routing message before the timer expires, initiating a second routing message via the first path and a second path in response to not receiving the first routing message before the timer expires, constructing a current network topology, evaluating the first path and the second path within the current network topology, and updating the current network topology.

19 Claims, 11 Drawing Sheets

(51) Int. Cl.
  *H04W 40/02* (2009.01)
  *H04L 12/751* (2013.01)
  *H04L 12/755* (2013.01)
  *H04W 84/18* (2009.01)

(56) References Cited

U.S. PATENT DOCUMENTS

| | | | |
|---|---|---|---|
| 7,920,463 | B2 | 4/2011 | Charzinski et al. |
| 7,958,262 | B2 | 6/2011 | Hasha et al. |
| 8,149,715 | B1 | 4/2012 | Goel et al. |
| 8,576,831 | B2 | 11/2013 | Zhang et al. |
| 8,693,345 | B2 | 4/2014 | Lee et al. |
| 9,344,320 | B1* | 5/2016 | Volkman ............... H04L 29/06 |
| 2004/0166853 | A1 | 8/2004 | Takeda et al. |
| 2005/0195835 | A1* | 9/2005 | Savage ................ H04L 43/00 370/401 |
| 2006/0018253 | A1 | 1/2006 | Windisch et al. |
| 2006/0215581 | A1 | 9/2006 | Castagnoli |
| 2007/0160050 | A1* | 7/2007 | Wang ................ H04L 12/2697 370/392 |
| 2009/0063986 | A1* | 3/2009 | Camenisch ............ G06F 21/64 715/733 |
| 2011/0310727 | A1* | 12/2011 | Guo .................. H04L 41/0677 370/216 |
| 2012/0163177 | A1 | 6/2012 | Vaswani et al. |
| 2012/0324100 | A1 | 12/2012 | Tomici et al. |
| 2013/0100942 | A1* | 4/2013 | Rudnick ............. H04B 7/2656 370/337 |
| 2013/0250812 | A1* | 9/2013 | Rath .................... H04W 24/02 370/255 |
| 2014/0082422 | A1 | 3/2014 | Yang |
| 2015/0009859 | A1* | 1/2015 | Inao ...................... H04W 4/70 370/254 |
| 2016/0212740 | A1* | 7/2016 | Hui ......................... H04W 4/06 |

FOREIGN PATENT DOCUMENTS

| | | |
|---|---|---|
| CN | 102299854 | 12/2011 |
| CN | 102804712 | 11/2012 |
| CN | 103460647 | 12/2013 |
| TW | 201110788 | 3/2011 |
| TW | 201301791 | 1/2013 |
| TW | 201304516 | 1/2013 |
| TW | 201519603 | 5/2015 |

OTHER PUBLICATIONS

"Office Action of Taiwan Counterpart Application", dated Jun. 27, 2016, p. 1-p. 4, in which the listed references were cited.

Johnson, et al., "The Dynamic Source Routing Protocol (DSR) for Mobile Ad Hoc Networks for IPv4," RFC 4728 (Experimental), IETF, Feb. 2007, pp. 1-pp. 107.

C. Perkins, et al., "Ad hoc On-Demand Distance Vector (AODV) Routing," RFC 3561 (Experimental), The Internet Society, Jul. 2003, pp. 1-pp. 37.

Charles E. Perkins, et al., "Highly Dynamic Destination-Sequenced Distance-Vector Routing (DSDV) for Mobile Computers," Computer Communication Review, Oct. 24, 1994, pp. 1-pp. 11.

P. Jacquet, et al., "Optimized Link State Routing Protocol for Ad Hoc Networks," Multi Topic Conference, IEEE INMIC, Technology for the 21st Century, Dec. 28-30, 2001, pp. 62-pp. 68.

Shree Murthy, et al., "An Efficient Routing Protocol for Wireless Networks," Baltzer Journals, Jan. 1, 1996, pp. 1-pp. 27.

"Office Action of European Counterpart Application," dated Jun. 23, 2015, p. 1-p. 8, in which the listed references were cited.

Ashwin G. Raiyani, et al., "Probabilistic and Neighbour Knowledge based flooding mechanism for AODV," 2014 Fourth International Conference on Advanced Computing & Communication Technologies (ACCT), Feb. 8-9, 2014, pp. 216-221.

Anil Yadav, et al., "A Novel Approach for Energy Management in Wireless Ad Hoc Network by Topology Control," 2011 World Congress on Information and Communication Technologies (WICT), Dec. 11-14, 2011, pp. 1334-1339.

Dalei Wu, et al., "Application-Centric Routing for Video Streaming Over MultiHop Wireless Networks," IEEE Transactions on Circuits and Systems for Video Technology, vol. 20, No. 12, Dec. 2010, pp. 1721-1734.

Intae Kang, et al., "On the Lifetime Extension of Energy-Efficient Multihop Broadcast Networks," Proceedings of the 2002 International Joint Conference on Neural Networks, vol. 1, May 12-17, 2002, pp. 365-370.

Jyoti Jain, et al., "Ant Colony Algorithm in MANET—Local link repairing of AODV," 2011 3rd International Conference on Electronics Computer Technology (ICECT), vol. 6, Apr. 8-10, 2011, pp. 270-273.

Hsing-Lung Chen, et al., "Two Hops Backup Routing Protocol in Mobile Ad Hoc Networks," Proceedings. 11th International Conference on Parallel and Distributed Systems, vol. 2, Jul. 20-22, 2005, pp. 600-604.

"Office Action of China Counterpart Application," dated Sep. 5, 2018, pp. 1-6.

* cited by examiner

ROUTING MESSAGE DELIVERY METHOD APPLICABLE TO NETWORK NODE AND NETWORK NODE USING THE SAME AND COMMUNICATION NETWORK USING THE SAME

TECHNICAL FIELD

The present disclosure generally relates to a routing message delivery method that is applicable to a network node, a network node using the same method, and a communication network using the same method.

BACKGROUND

In a proximity-based relay network, there could be one or more network nodes that are interconnected among one another, and any one of the network nodes may function as a relay to forward messages from one location of a network to another location of the network. A network node may connect to another network node through a wireless connection, a coaxial cable, a fiber optical cable, and so forth. In addition, a network node could be an access point which provides Wi-Fi connections to one or more electronic devices. The network node may or may not have internet connect and thus may rely on another network node to access the internet. In that, case, the relay node would need to determine how to forward a message from another network node and how to initiate its own message according to a predetermined mechanism.

Thus, in order for a network node to function as a part of the whole, the network node would be required to operate under a predefined mechanism in order for the proximity-based relay network to maintain an operable network topology. For instance, a network node could be required to maintain a routing table so that the network would know who the neighboring network nodes are and what routes could be available if a message is to be forwarded or initiated. However, assuming that each of the network nodes of a proximity-based relay network is able to initiate its own message and to dump the message into the network at any time, a glut of information may cause the proximity-base relay network to overload. Therefore, one of the important goals in a network design may involve effectively managing the topology of the network in order to reduce the burden of the network.

Also, the mechanism of choosing network routes could be crucial. Typically, when a network node could select from different routes to deliver a message, the network node would select the route having the least number of hops. However, this method of selecting route might not be optimal. For example, under the circumstance in which one or more network nodes are outdoors and thus are not plugged into a power source, there could be problems related to the power level. Also the quality of connections as well as distances among network nodes could also be pertinent. Therefore, a robust mechanism could be in place to determine the selection of network routes.

Moreover, a network node could be suddenly offline or another network node could be suddenly activated. Each network node may need to have a way to find out what network nodes within the proximity-based relay network are offline and what network node are newly activated so that each network node would be able to adapt to new circumstances and react whenever the circumstance changes. If changes to the network topology are not known by the network nodes, then the discrepancies of the routing tables among network nodes may result in network errors which may cause data packets to be lost or mishandled.

SUMMARY OF THE DISCLOSURE

Accordingly, the disclosure relates to a routing message delivery method that is applicable to a network node, a network node using the same method, and a communication network using the same method.

According to one of the exemplary embodiments, the proposed routing message delivery method would include at least but not limited to initiating a timer having a first timer value that is a non-zero positive number, forwarding a first routing message via a first path in response to receiving the first routing message before the timer expires, initiating a second routing message via the first path and a second path in response to not receiving the first routing message before the timer expires, constructing a current network topology, evaluating the first path and the second path within the current network topology and maintaining the current network topology.

According to one of the exemplary embodiments, the proposed network node would include at least but not limited to a timer, for initiating a timer having a first timer value that is a non-zero positive number, a routing message forwarder, for forwarding a first routing message via a first path in response to receiving the first routing message before the timer expires, a routing message initiating circuit, for initiating a second routing message via the first path and a second path in response to not receiving the first routing message before the timer expires, a routing table generator, for constructing a current network topology and updating the current network topology, and a routing metric evaluating circuit, for evaluating the first path and the second path within the current network topology to deliver a data packet via the first path or the second path .

According to one of the exemplary embodiments, the proposed communication network would include at least but not limited to a first network node that includes a timer, for initiating a timer having a first timer value that is a non-zero positive number, a routing message forwarder, for forwarding a first routing message via a first path in response to receiving the first routing message before the timer expires, a routing message initiating circuit, for initiating a second routing message via the first path and a second path in response to not receiving the first routing message before the timer expires, a routing table generator, for constructing a current network topology and updating the current network topology, a routing metric evaluating circuit, for evaluating the first path and the second path within the current network topology, and a first wireless interface, and a second network node including a second wireless interface, for communicating with the first network node via the first wireless interface.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
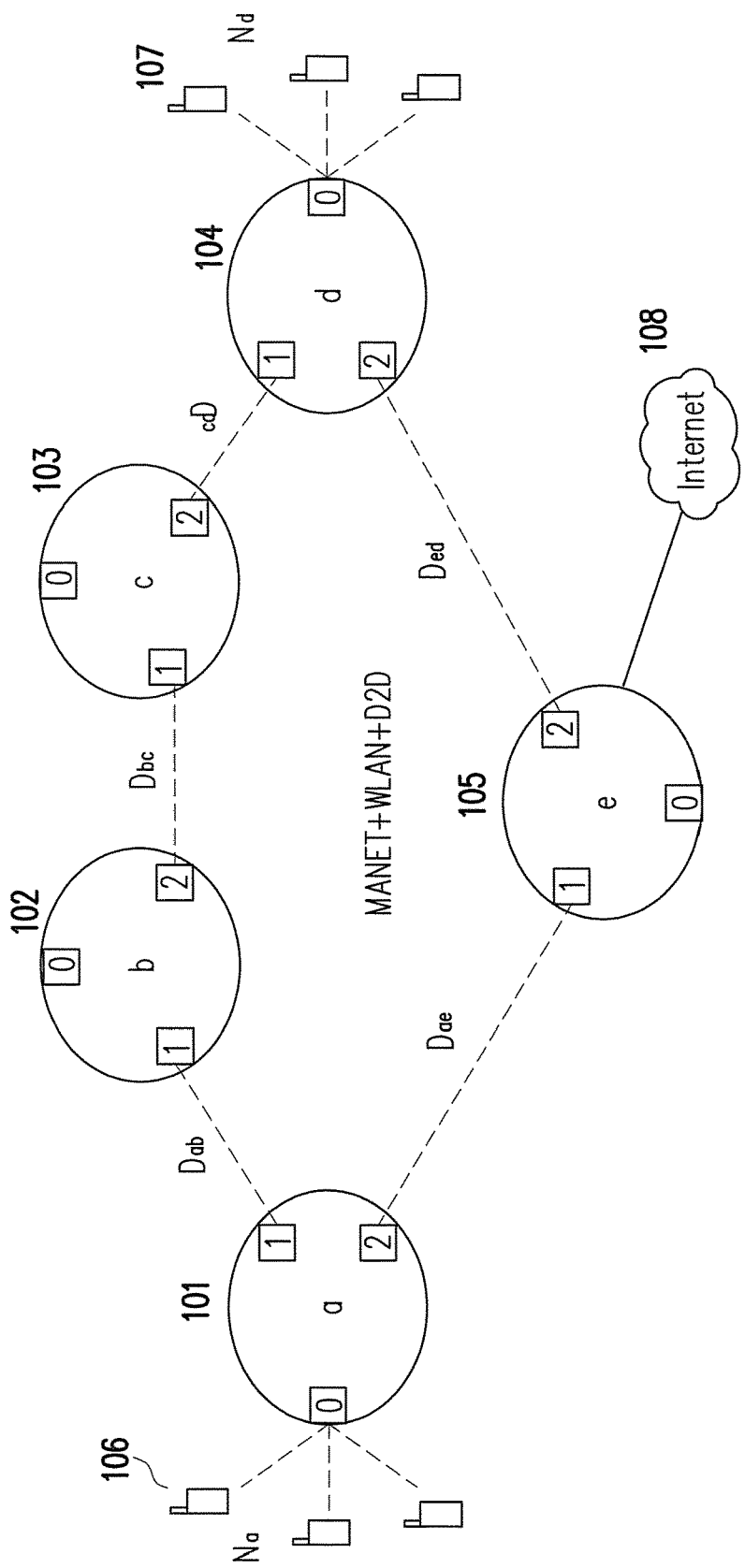
FIG. 1A illustrates a proximity-based relay network according to one of the exemplary embodiments of the disclosure.

The disclosure proposes a routing message delivery method that is applicable to a network node in a proximity-based relay network, a network node using the same method, and a communication network using the same method. Within a proximity-based relay network, a network node would be able to determine whether to forward or to initiate a routing message according to a timer setting so as to prevent overloading the network. Also, metrics for all possible routes would be evaluated by a network node according to an algorithm in order to determine the best route to transmit data. Moreover, under the circumstance in which a network node is newly activated or suddenly deactivated, the dynamic network topology of the proximity-based relay network would update the routing record within each network node so as to eliminate network errors.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1A illustrates an exemplary proximity-based relay network according to one of the embodiments of the disclosure. The exemplary proximity-based relay network could be similar to a modified Mobile Ad-hoc Network (MANET) that could support a wireless local area network (WLAN) and device to device (D2D) communications. The exemplary proximity-based relay network may include a plurality of network nodes such as network nodes 101~105 in FIG. 1A. Each network node could be a Wi-Fi access point (AP) without wired connections. Each network would have a plurality of network interfaces which are physical hardware interfaces such as hardware cards that adhere to a specific communication standard not limited to IEEE 802.1x. For example, network node 101 has three network interfaces labeled '0', '1', and '2'. Network interface 0 of the network node 101 is dedicated to providing a wireless connection to the WLAN 106, network interface 1 of network node 101 is wirelessly connected to network node 102, and network interface 2 of network node 102 is connected to network node 105. A similar principle would apply to other network nodes. For example, network interface 0 of network node 103 could be used to service a WLAN while network interface 1 and 2 could be used to connect to two different network nodes through providing a Wi-Fi service.

Also each network node would be able to directly connect to other network nodes as long as other network nodes are within a wireless range of its network interfaces. For instance, network node 101 would be able to connect to network node 102 and network node 105 as network node 102 and network node 105 are within the wireless range of the network interface 1 and 2 of the network node 101. However, if the network node 101 were to have a fourth network interface, network interface 3 (not shown), and the network node 103 is assumed to be within the range of the network interface 3, then the network node 101 would also be able to connect to the network node 103.

Each network node may support a WLAN having one or more user devices. For example, the network node 101 has a WLAN 106 under its domain in order to provide wireless connections for mobile electronic devices which may wish to connect to the internet. However, internet connection would only be directly provided by the network node that has the hardware infrastructure to access the internet. For a network node that is without the hardware infrastructure for direct internet access, internet connection could be provided indirectly by relaying the internet connection through one or more network nodes. For example, the network node 101 may either access the internet directly or may have to indirectly provide an internet connection by routing service requests of the WLAN 106 to another network node that has the direct internet access. However, only the network node 105 has direct access to the internet in the example of FIG. 1A and thus WLAN 106 would need to connect to the internet indirectly either through the paths of $D_{ae}$ or through the path of $D_{ab}$, $D_{bc}$, $D_{ad}$, and $D_{ed}$. The network nodes 101~105 could be, for example, wireless routers with multiple network interfaces, and network node 105 in particular could be a wireless router connected to a modem (not shown). From the perspective of user devices, a network node could be perceived as an ordinary Wi-Fi AP.

Figure 1B:
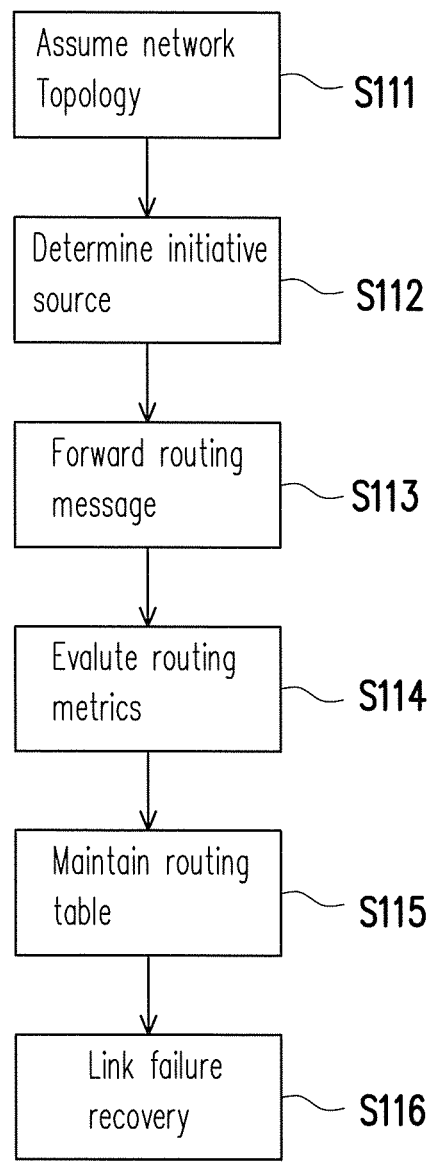
FIG. 1B illustrates a proposed routing method that is applicable to a network node according to one of the exemplary embodiments of the disclosure.

FIG. 1B illustrates an overview of the proposed routing method that is applicable to a proximity-based relay network according to one of the exemplary embodiments of the disclosure. In step S111, a wireless topology is assumed by a network node. For example, a network node may obtain information of the most recently known wireless topology from a routing table which could be stored in a non-transitory storage medium native to the wireless node. By obtaining information of the wireless topology, a network node would know all the possible paths to deliver information to a particular network node and thus would be able to know the best neighboring node to deliver a data packet to. In step S112, the initiative source of a routing message would be determined. In particular, a network node would determine whether to initiate its own routing message by initiating a timer to a first default value that is a non-zero, positive number. If the timer that has been set to the first default value has expired without receiving a routing message from another neighboring network node, then the network node may initiate a routing message and reset the timer to the first default value after transmitting the routing message. The routing messages would be for constructing or updating a network topology. The routing messages would be delivered in a flooding manner as a network node would eventually transmit a routing message to each neighboring node, which is an adjacent network node directly accessible within the range of a wireless interface within the network node. After constructing the network topology, a network node would select the optimum path to deliver data packets.

In step S113, if the network node has instead received a routing message before the timer that was set to the first default value has expired, then the network node would forward the routing message to a neighboring network node. The network node would then reset the timer to a second default value that is smaller than the first default value after forwarding the routing message, and then the network node may determine whether a next routing message is received before the timer set to the second default value has expired before. If that is the case, then the network node would forward the routing message and reset the timer to a third default value that is smaller than the second default value. Otherwise, the network node would initiate the routing message and reset the timer to the first default value. A routing message would include contents not limited to AP Subnet information, a number of attached users, global positioning satellite (GPS) information, battery status of a network node, and so forth.

However, to determine which neighboring network node to forward the data packets to, the network would need to know the optimum path. Thus in step S114, the network node would objectively evaluate all the paths between the network node and the target network node by calculating a metric for all the paths. The calculation of the metric would be elaborated later on in this disclosure. After an optimal path has been determined according to the path with the best metric, the routing message will be transmitted. If the routing message was received to be forwarded, information of the current network node as well as the selected path will be appended to the routing message previously received. In step S115, the network node would update the routing table stored within the storage medium of the network node so that the routing table contains the most current information of the network topology. In step S116, the network node would perform link failure recovery if a network node within its own proximity-based relay network is suddenly offline. Details of each step of FIG. 1B will be elaborated later in the disclosure.

Figure 1C:
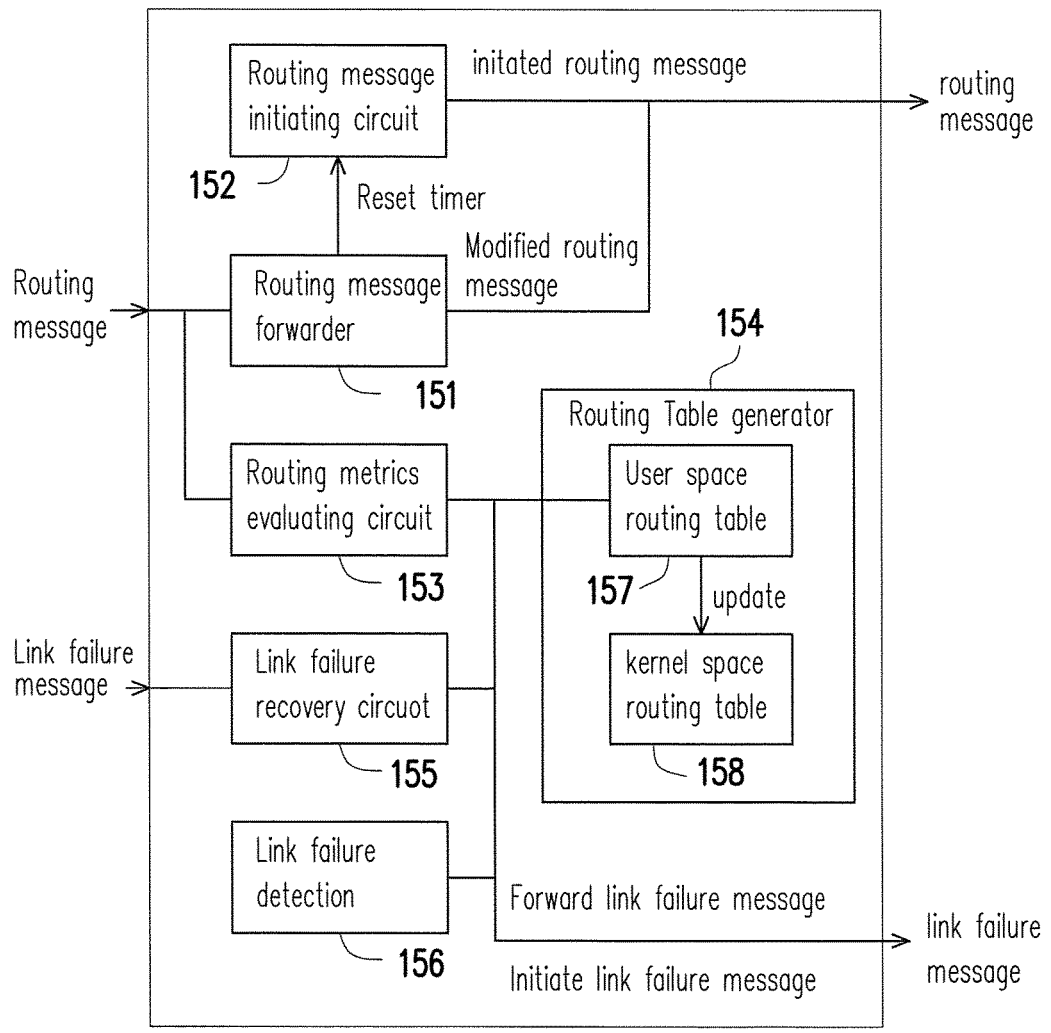
FIG. 1C illustrates a network node in terms of a functional block diagram according to one of the exemplary embodiments of the disclosure.

FIG. 1C illustrates a network node in terms of a functional block diagram according to one of the exemplary embodiments of the disclosure. A network node 150 would include at least but not limited to multiple network interfaces (shown in FIG. 1A), a Routing Message Forwarder Circuit 151, a Routing Message Initiating Circuit 152, a Routing Metrics Evaluating Circuit 153, a Routing Table Generator Circuit 154, a Link Failure recovery Circuit 155, and a Link Failure Detection Circuit 156. Each of the Circuits 151~156 could be interfaced with or be a part of a central processing unit (CPU) (not shown) and a non-transitory storage medium (not shown). Also each of the Circuits 151~156 could be electrically connected directly or indirectly with the aforementioned network interfaces. The Routing Table Generator Circuit 154 may interface with the storage medium to generate, maintain, and update a User Space Routing Table 157 and a Kernel Space Routing Table 158. Each network interface may include a transmitter, a receiver, and one or more antennas for transmitting and receiving wireless signals. From the receiver of a network interface, the network node 150 may receive a routing message from another network node, a link failure message from another network node, and messages to be initiated and delivered from the WLAN. Specific details of each of the Circuits 151~156 will be further elaborated later on in this disclosure.

Figure 1D:
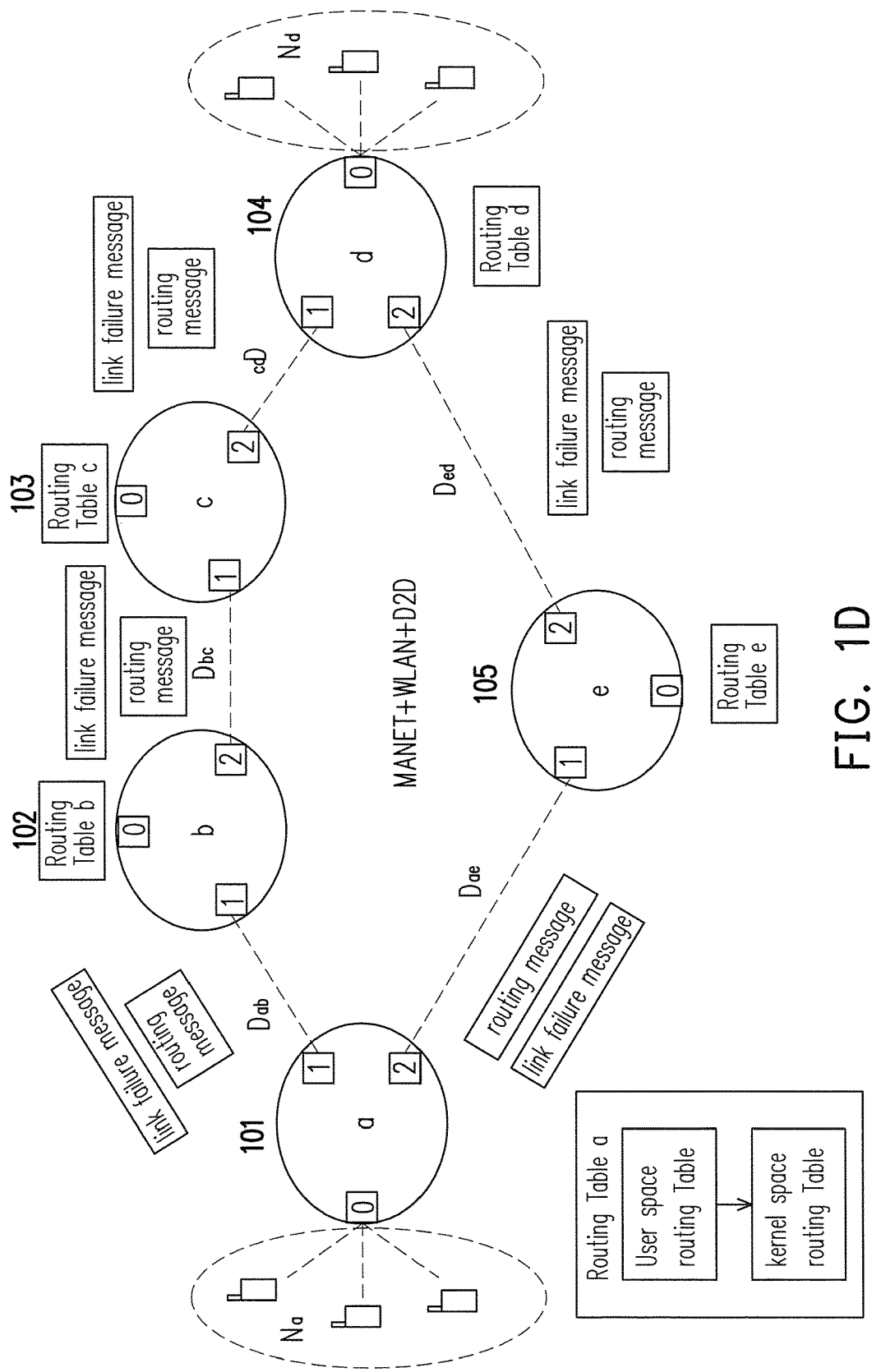
FIG. 1D a proximity-based relay network according to one of the exemplary embodiments of the disclosure.

FIG. 1D illustrates an exemplary proximity-based relay network based on the exemplary network of FIG. 1A with further details. Between two network nodes that are connected, routing messages, data packets (not shown), and/or link failure messages could be exchanged. Each of the network nodes 101~105 may initiate one or more data packets to be relayed by other network nodes to the network node that has the hardware infrastructure to connect to the interne. Each of the network nodes such as network node 101 would store a Routing Table which includes a user Space Routing Table and a Kernel Space routing table. Based on the routing table and the calculated metric associated with each route, a network node would know the best path to deliver at least one data packet. The optimal path or route is the route or path having the best calculated metric value.

Figure 2A:
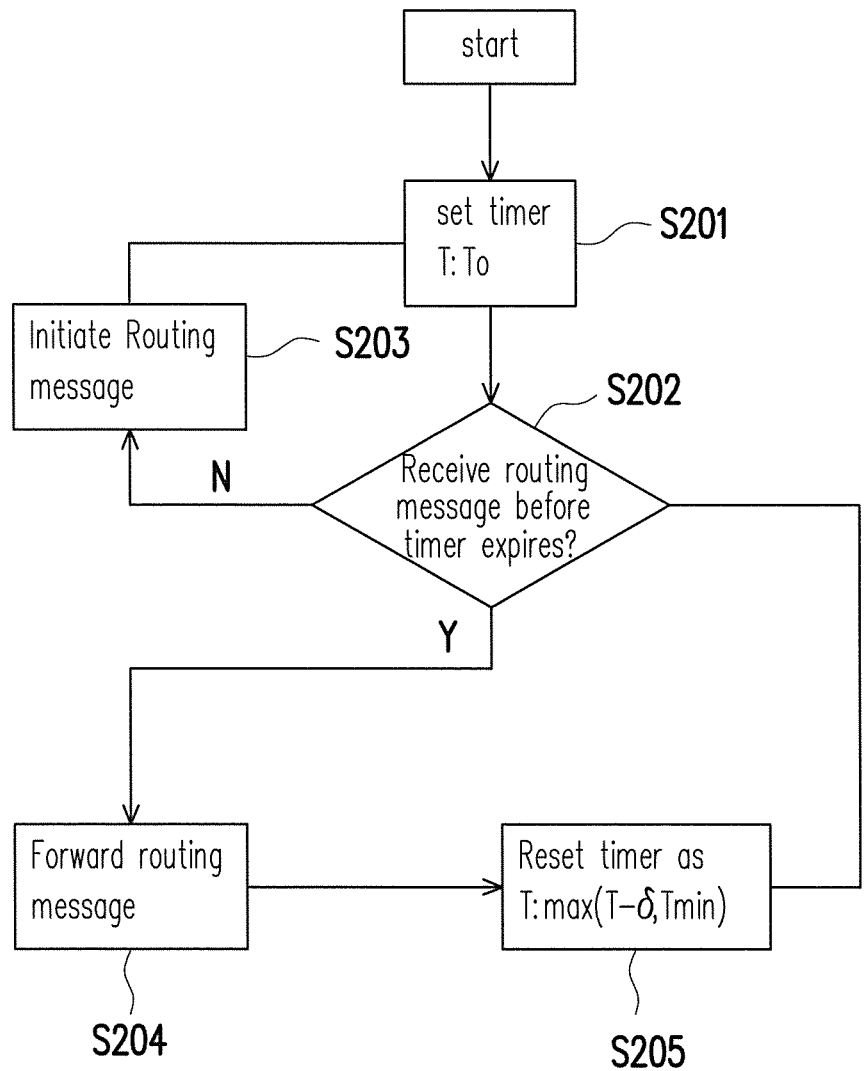
FIG. 2A illustrates the initiating and relaying process of a routing message according to one of the exemplary embodiments of the disclosure.

Steps S112 and S113 of FIG. 1B is to be elaborated with further details. FIG. 2A illustrates the initiating and relaying process of a routing message according to one of the exemplary embodiments of the disclosure. FIG. 1C will also be referred to along with FIG. 2A. In step S201, the processor of the network node may set the timer to a first default value which is a non-zero positive number and subsequently start the timer. In step S202, the Routing Message Forwarder Circuit 151 may interact with a CPU of the network node to determine whether a network interface of the network node has received a routing message before the first default value of the timer has expired. If a routing message has been received before the first default value of the timer has expired by a network node, then in step S204 the Routing Message Forwarder Circuit 151 will forward the routing message through a transmitter of a network interface. Subsequently, in step S205, the Routing Message Forwarder Circuit 151 will reset the timer to a second default value which is the first default value subtracted by a predetermined $\delta$ value, where the $\delta$ value is a positive, non-zero value. If another routing message has been received before the second default value has expired, then steps S204 and S205 would be repeat by resetting the timer to a third default value which is less than the second default value $\delta$ value and less than the first default value by $2 \times \delta$ value.

If no routing message is received before the first default value of the timer has expired, then in step S203, the Routing Message Initiating Circuit 152 would initiate a routing message and transmit the routing message through the transmitter of a network interface. Step S201 would then repeat as the Routing Message Initiating Circuit 152 resets the timer back to the first default value with the assistance of a CPU. When a routing message is forwarded, the Routing Message Forwarder Circuit 151 would append the routing message with additional information such as information related to the path and information related to the network node.

Figure 2B:
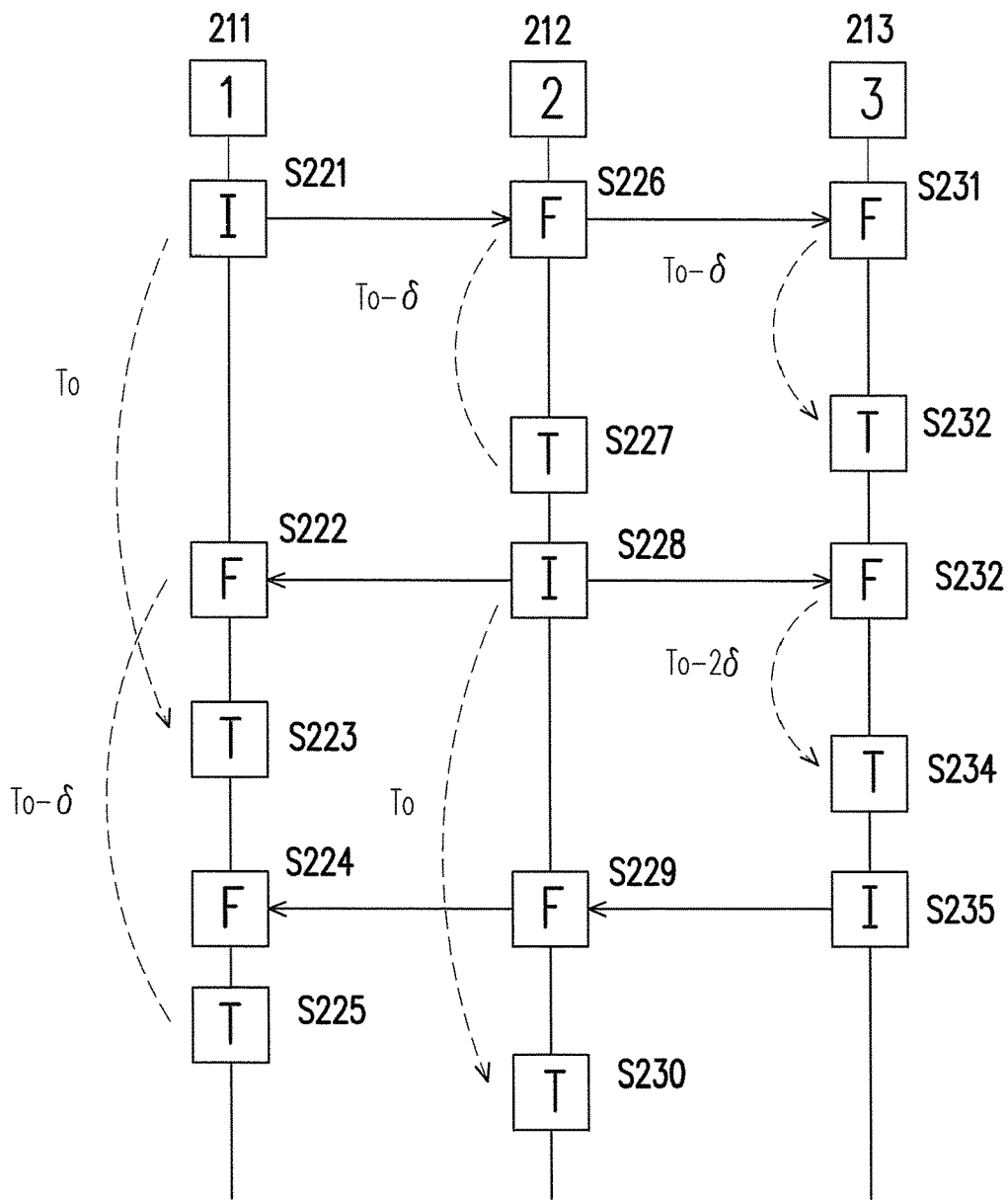
FIG. 2B illustrates an example of determining an initiative source by using the diagram of FIG. 2A.

FIG. 2B illustrates an example of determining an initiative source by using the diagram of FIG. 2A. In this example, three network nodes 211, 212, and 213 are assumed to be connected in sequence. In step S221, network node 211 is assumed to have initiated a first routing message and set a timer to a first default value. The first routing message is transmitted to network node 212. The timer is set to expire at time $T_0$ in step S223 if no routing message is received. However, in step S222, if a second routing message is assumed to have been received, then the second routing message would be forwarded and the timer will be reset to expire at time $T_0-\delta$ in step S225. However, before the timer is expired in step S225, a third routing message has been received in step S224, and the network node will forward the third routing message in response to receiving the third routing message.

For the example of network node 212, in step S226, the network node 212 has received the first routing message from the network node 211 and subsequently forward the first routing message to the network node 213. The network node 212 would then reset the timer to the second default value which is $T_0-\delta$ to be expired in step S227. However, it is assumed that no routing message was actually received before step S227 would have occurred, then in step S228, the network node 212 would initiate a fourth routing message to be transmitted to network node 211 and network node 213 and reset the time to a first default value to be expired in step S230. However, it is assumed that a fifth routing message was received in step S229 from network node 213. The timer will then be reset to the second default value.

For the example of network node 213, in step S231, the network node 213 has received the first routing message to be forwarded. The network node 213 then forward the routing message and reset the timer to the second default value which will expire in step S232. However, in step S232, the network node 213 has received the second routing message from the network node 212. Assuming that in step S232, the second routing message is received before the second default value has expired, then in step S232, the timer will be reset to a third default value which is $T_0-2\delta$ to be expired in step S234. In step S235, since no routing message was received before the timer set to the third default value has expired, the network node 213 would initiate a routing message to be forwarded It should be noted that the third default value is not necessarily less than the second default value by $\delta$ but could be less than the second default value by a different value from $\delta$, as long as the third default value is smaller than the second default value.

Figure 3A:
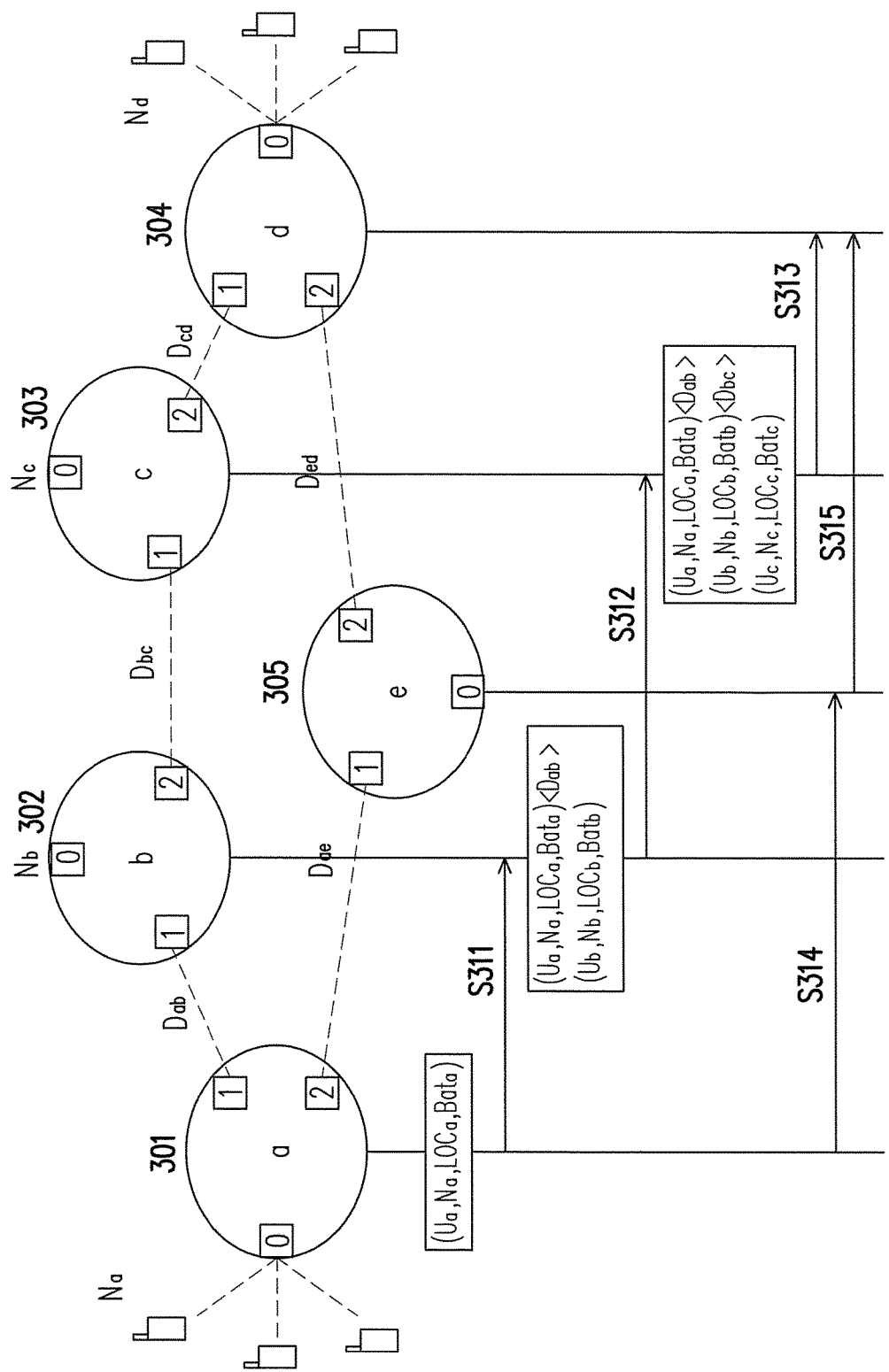
FIG. 3A illustrates transmitting a routing message according to one of the exemplary embodiments of the disclosure.

FIG. 3A illustrates transmitting a routing message according to one of the exemplary embodiments of the disclosure. In step S301, network node 301 initiates a first routing message, and the Routing Message Initiating Circuit 152 of network node 301 would transmit the first routing message via network interface 2 of the network node 301. The first routing message would include parameters not limited to $U_a$, $N_a$, $Loc_a$, $Bat_a$, where $U_a$ is the user number of a user device wirelessly attached to the network node 301, $N_a$ is the AP Subnet address of network node 301, $Bat_a$ is the battery status of the network node 301, and $Loc_a$ is the GPS location of the network node 301.

The routing message is received by the network interface 1 of the network node 302. The distance between network node 301 and network node 302 is denoted as $D_{ab}$ in FIG. 3A. In response to receiving the first routing message, the network node 302 would forward the first routing message to its destination by appending a distance information and information related to network node 302 to the first routing message as a second routing message. In step S312, the network node 302 would transmit to the network node 303 the second routing message including ($U_a$, $N_a$, $Loc_a$, $Bat_a$), <$D_{ab}$>, and ($U_b$, $N_b$, $Loc_b$, $Bat_b$), wherein $U_b$ is the user number of a user device wirelessly attached to the network node 301, $N_b$ is the AP Subnet address of network node 302, $Bat_b$, is the battery status of the network node 301, and $Loc_b$ is the GPS location of the network node 301. In step S 313, the network node 303 would forward to network node 304 the second routing message by appending the second routing message with the information related to the distance between the network node 303 and the network node 304 as well as the information of the network node 304 so as to generate a third routing message which would include ($U_a$, $N_a$, $Loc_a$, $Bat_a$), <$D_{ab}$>, and ($U_b$, $N_b$, $Loc_b$, $Bat_b$), <Dab>, and ($U_b$, $N_b$, $Loc_b$, $Bat_b$). Alternatively, in step S314 the network node 301 could have transmitted the first routing message to network node 305, which would in step S315 deliver the second routing message to network node 304. In that case, the third routing message would include ($U_a$, $N_a$, $Loc_a$, $Bat_a$), <$D_{ab}$>, and ($U_e$, $N_e$, $Loc_e$, $Bat_e$). By having a node appending information to a received routing message, the quantity of messages could be reduced.

Figure 3B:
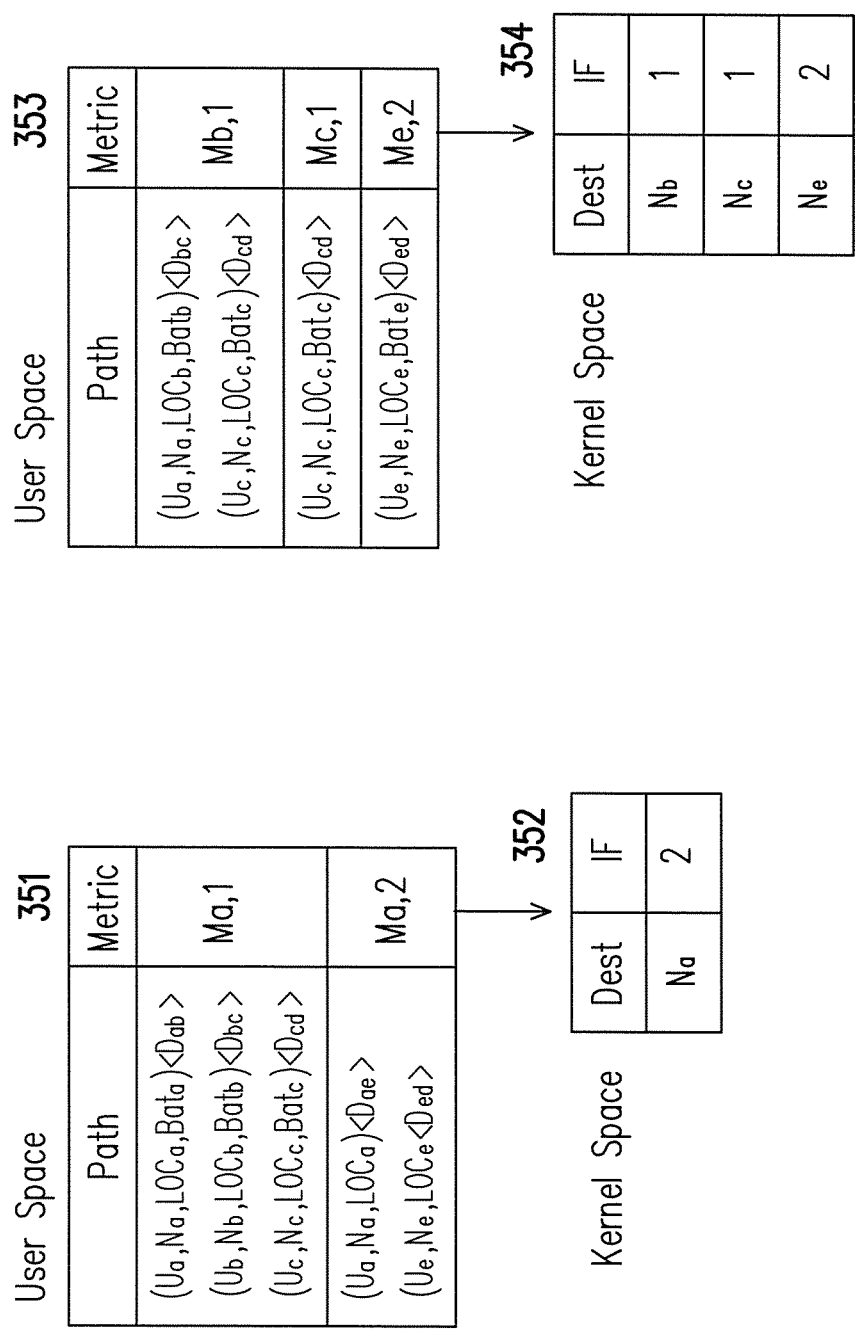
FIG. 3B illustrates maintaining a routing table according to one of the exemplary embodiments of the disclosure.

FIG. 3B illustrates maintaining a routing table according to one of the exemplary embodiments of the disclosure. In general, a network node may utilize the Routing Table Generator 154 to generate, maintain, and update the routing table stored within each network node. Each routing table may include a User Space 157 and a Kernel Space 158. The User Space is associated with the application layer so that an operator of a network node may access the User Space routing table. The kernel includes information that is accessible by the operation system of a network node but might not be easily accessible by the application layer. Since information in the routing table is simple, routing efficiency could be improved. Also by appending information to received message, multiple node information could be retrieved at once.

As for the example of FIG. 3A, based on information previously received, the network node 301 would know that in order to transmit a routing message to network node 304, there could be two possible paths by referring to the Routing Table of FIG. 3B. The first path would traverse through <$D_{ab}$>, <$D_{bc}$>, <$D_{cd}$>, and the second path would traverse through <$D_{ae}$> and <$D_{ed}$> as evident in the User Space portion 351 of the Routing Table. In a Kernal Space portion, it shows the destination and the interface number that is to reach the destination. For example, in the Kernal Space 352, it shows that the destination associated with the second path is Na, which is the AP Sub address of network node 301, and the network interface is "2." Similarly, the User Space Table 353 shows the paths and their corresponding metrics, and the Kernal Space 354 shows the destinations and their corresponding network interfaces. In order to evaluate which one of the two paths is the optimal path, the network node 301 would utilize the Routing Metrics Evaluating Circuit 153 to calculate multiple routing metrics, such as the metrics $M_{a1}$ and $M_{a2}$, in the User Space 351 portion of the Routing Table. The calculation of metrics would correspond to step S114 of FIG. 1B.

The metric in general would be calculated based on the node type of a network node, the node battery status, distance between nodes, and user number. In detail, the metric, Wr, could be calculated as follows:

$w_r=1$ if the destination is directly next to the source, otherwise $$w_r = W_M^{N_M} * W_D^{N_D} * \gamma^{I(.)} * \Pi_{\forall i}\left(\frac{d_i}{d_o}\right)^{-1}$$

Where $W_M$ and $W_D$ are respectively weights associated with MANAT and delay-and-disruption tolerant network (DTN) relay, respectively, and $N_M$ and $N_D$ are the numbers of MANAT and DTN relays, respectively. The parameter γ would be a very small value that is meant to limit the use of low battery or over-loaded route. I(·)=0 only when every node on a particular route has battery level higher than a predefined threshold $B_{th}$, and every node on the particular route is not over-loaded based on the number of attached user determined from the user number parameter. If the above mentioned criteria is not satisfied, I(·)=1. Also, $d_i$ is the distance of i-th segment of a route, do is a reference distance, and 1 is distance impact factor. The parameters could be configured subject to different purposes or services. For example, for streaming applications, MANET is preferred over DTN as $1>W_M>W_D$, and for delay-tolerant applications, DTN is preferred over MANET as $1>W_D>W_M$. In this way, sub-routes consistency would be guaranteed.

After the Routing Metrics Evaluating Circuit 153 calculates a metric for each route, a network node would be able to select the optimal path with the best metric number to deliver one or more data packets. As for the example of FIG. 3A, after the metrics are calculated as shown in the Routing Table of FIG. 3B, assuming that Ma,2 has a better metric value than Ma,1, then the path of $<D_{ae}>$ and $<D_{ed}>$ would be selected. The Routing Table Generator 154 may then update the User Space Routing table 157 and the Kernel Space Routing table 158 to record the calculated metrics in the Routing Table. Also, as a routing message is initiated by the Routing Message Initiated Circuit 152 or forwarded by the Routing Message Forwarder Circuit 151, the Routing Table Generator may update the Routing Table to reflect the path information selected or appended by each network node.

Figure 4:
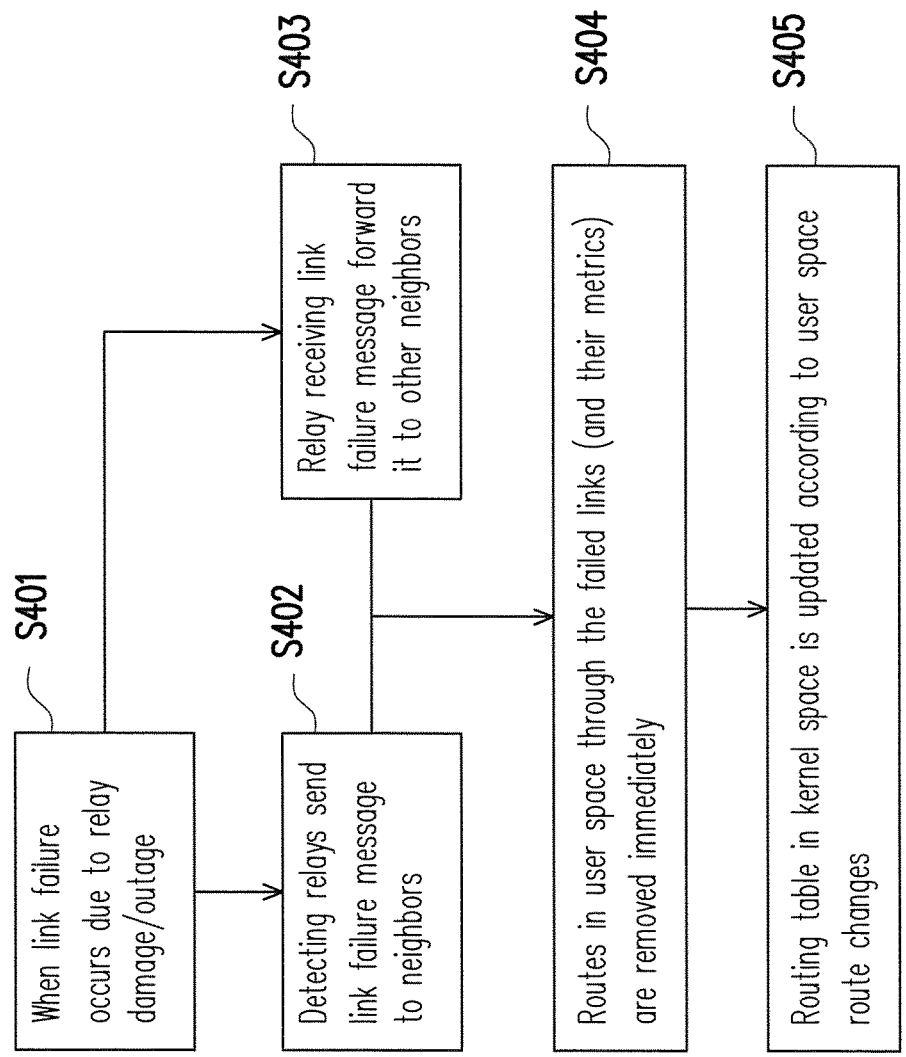
FIG. 4 illustrates link failure recovery according to one of the exemplary embodiments of the disclosure.

FIG. 4 illustrates link failure recovery according to one of the exemplary embodiments of the disclosure. In step S401, it is assumed that a link failure has occurred because of relay damage or outage. In step S402, the link failure detection circuit 156 of a network node has detected a network error that is intrinsic to the network node, and thus transmits a link failure message to inform the neighboring network nodes. Instead of step S402, in step S403, the link failure recovery circuit 155 may receive a link failure message from another neighboring node. In response to receiving the link failure message, the link failure recovery circuit 155 may forward the link failure message to neighboring network nodes via a transmitter of a network interface. In step S404, the network node would remove the failed route in the User Space Routing Table 157 so as to prevent the route from being selected by the network node. In step S405, the Kernel Space Routing Table 158 would be updated according to the route changes in the User Space Routing Table 157.

Figure 5:
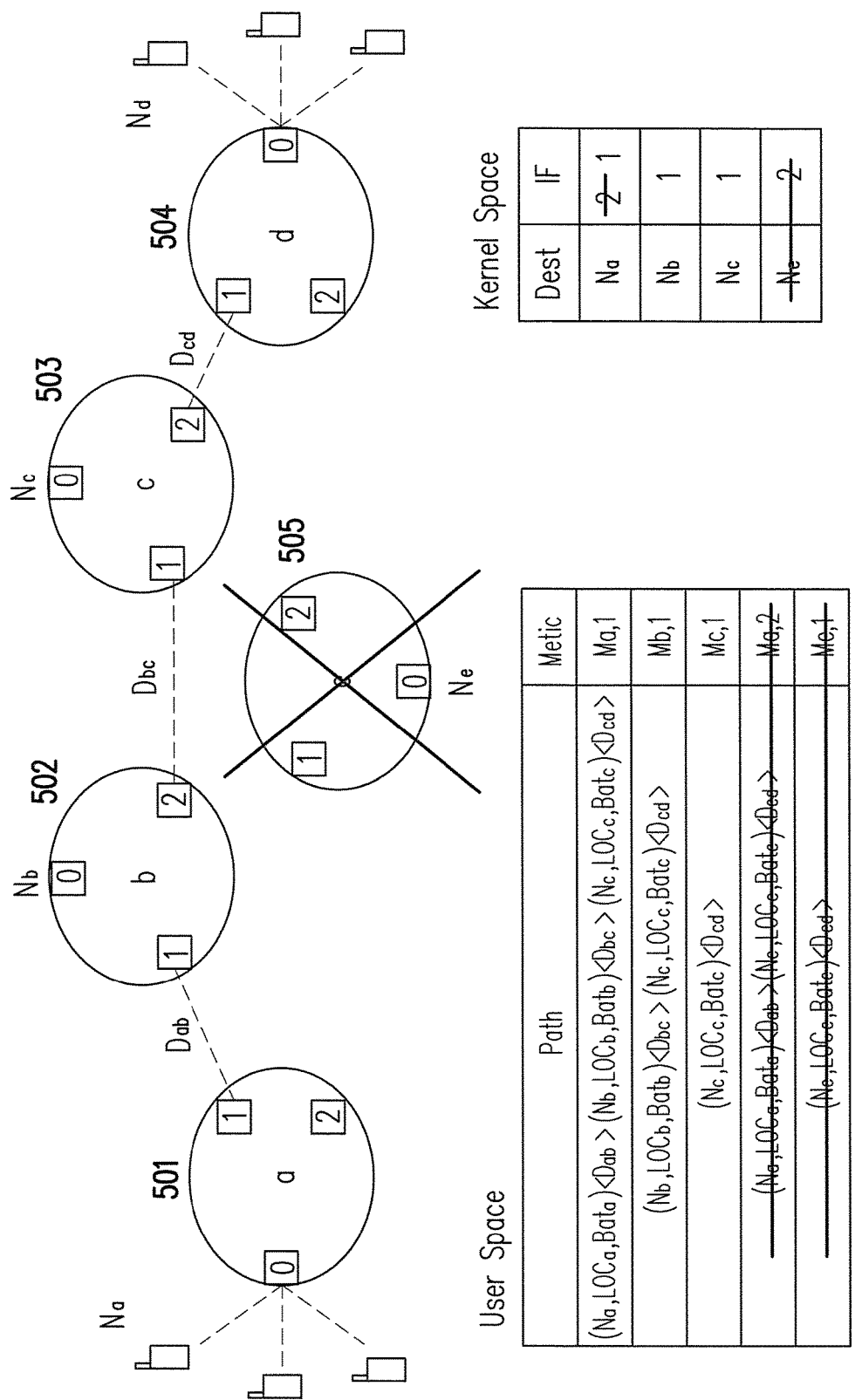
FIG. 5 illustrates maintaining a routing table during a link failure recovery according to one of the exemplary embodiments of the disclosure.

FIG. 5 is an example that illustrates the maintenance of a routing table during a link failure recovery according to one of the exemplary embodiments of the disclosure. FIG. 4 and FIG. 5 would be referred together. In step S401, it is assumed that network node 505 has experienced a network link failure because of relay damage or outage such that the network node 505 is unable to connect to network node 501 and network node 504. In step 402, the network node 501 and 503 may have detected the network failure of the network node 505 and transmit a link failure message to the neighboring nodes to inform network node 501 and network node 504 of the failure. In particular, in step S403, the network node 501 may transmit a link failure message to network node 502, and the network node 504 may transmit a link failure message to the network node 503 upon detecting the failure of the network node 505. In step S404, assuming that the User Space 511 and Kernal Space 512 are maintained within network node 504, the User Space 511 of a Routing Table would be updated by removing failed routes from the Routing Table. For this example, the routing information associated with the path $<D_{ae}>$ and $<D_{ed}>$ would be removed by removing the last two entries of the User Space 511, since network node 505 has been severed from the rest of the network, the paths $<D_{ae}>$ and $<D_{ed}>$ would be unavailable. In step 405, the Kernal Space Table 512 would be updated to reflect the changes made to the User Space table 511. For this example, the network interface 2 that corresponds to the destination network node, $N_a$, will no longer be available and thus the interface parameter that corresponds to $N_a$ of Kemal Space 512 would be changed from 2 to 1 as the path to $N_a$ would be re-routed to network interface 1 of $N_a$ instead, and also the Kernel Space 512 table shows that the network interface 2 of $N_e$ together with $N_e$ would be unavailable as $N_e$ is be entirely unavailable because of failure.

Figure 6:
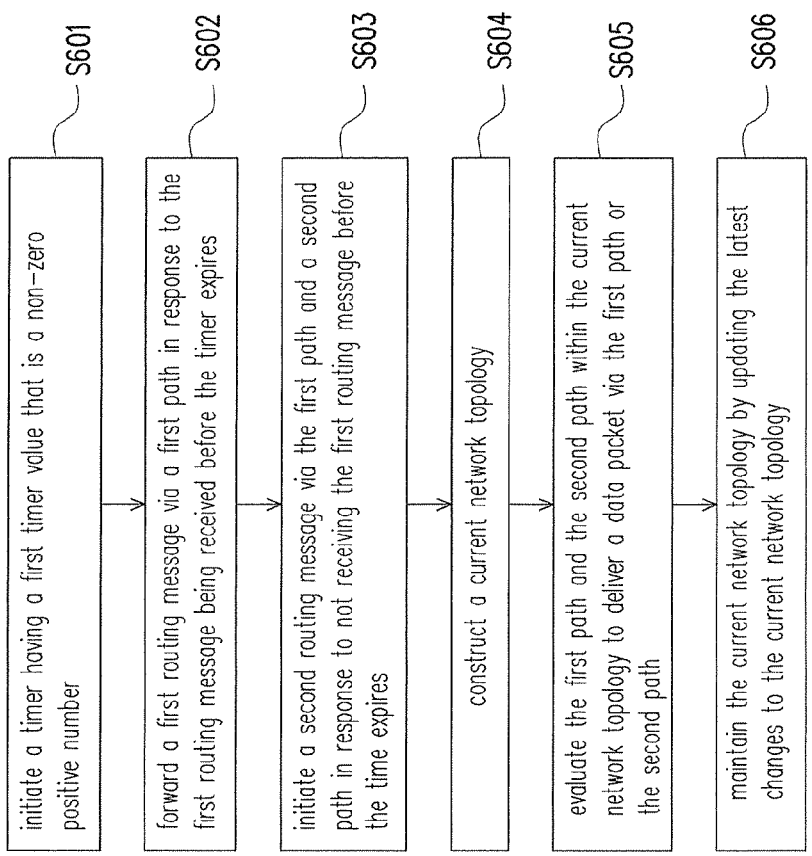
FIG. 6 summarizes the proposed routing method that is applicable to a network node according to one of the exemplary embodiments of the disclosure.

FIG. 6 summarizes the proposed routing method that is applicable to a network node according to one of the exemplary embodiments of the disclosure. It should be noted that the disclosure does not limit the following steps in the exact sequence. In step S601, the network node would initiate a timer having a first timer value that is a non-zero positive number. In step S602, the network node would forward a first routing message via a first path in response to the first routing message being received before the timer expires. Otherwise, in step S603 the network node would initiate a second routing message via the first path and a second path in response to not receiving the first routing message before the timer expires as the network node may initiate a routing message by flooding to all or at least one neighboring network nodes. In step S604, the network node may construct a current network topology. In step S605, the network node would evaluate the first path and the second path within the current network topology to deliver a data packet via the first path or the second path. In step S606, the network node may maintain the current network topology by updating the latest changes to the current network topology.

In one of the exemplary embodiment, forwarding the first routing message in response to receiving the first routing message before the timer expires may further include resetting the timer as a second timer value that is less than the first timer value by δ after transmitting the first routing message, wherein δ is a non-zero positive number and forwarding a third routing message if the third routing message is received before the second timer value expires.

In one of the exemplary embodiment, initiating the second routing message in response to not receiving the first routing message before the timer expires may further include resetting the timer as the first timer value after transmitting the second routing message and determining whether a fourth routing message is received before the first timer value expires.

In one of the exemplary embodiment, the aforementioned forwarding the first routing message may include receiving the first routing message comprising a first set of network node parameters and a first distance parameter, appending the first routing message with the second set of network node parameters and a second distance parameter, and forwarding the first routing message comprising the first set of network node parameters, the second set of network node parameters, the first distance parameter, and the second distance parameter.

In one of the exemplary embodiment, both the first set of network node parameters and the second set of network node parameters may include a user number, an access point (AP) subnet address, a global positioning satellite (GPS) address, and a battery status.

In one of the exemplary embodiment, the aforementioned evaluating the first path and the second path within the current network topology may include calculating multiple routing metrics based on a type of a target node, a battery status of the target node, a distance between the network node and the target node, and a user number, and evaluating an optimal path having the best routing metric to deliver a data packet. The above mentioned node type is a weight associated with a Mobile Ad Hoc Network (MANET) relay or a delay and disruption tolerant network (DTN) relay.

In one of the exemplary embodiment, the aforementioned updating the current network topology may include updating a routing table comprising a User Space Routing Table and a Kernel Space Routing Table. The User Space Routing Table may include the first path and a first metric associated with the first path. The Kernel Space Routing Table may include a destination network node and a network interface number of the destination network node.

The aforementioned updating network topology may further include detecting a failure of another network node, transmitting a first failure message to other neighboring nodes, and forwarding a second failure message to other neighboring nodes.

In one of the exemplary embodiment, the aforementioned updating network topology may further include removing the another network node t associated with the failure from the User Space Routing Table and the Kernel Space Routing Table; and updating the routing table to reflect the changes associated with removing the another network node.

In view of the aforementioned descriptions, the disclosure is suitable for use by a communication system having a proximity-based relay network and may reduce the necessary information to be exchanged among network nodes when each network node is required to maintain and update an accurate current network topology. Also, the disclosure when used by a proximity-based relay network would accurately determine a suitable route to deliver a message so as to optimize the overall network performance. Furthermore, the disclosure when used by a proximity-based relay network would react to sudden changes of network topology so as to minimize the probability of network errors caused by having different knowledge of the network topology among network nodes.

No element, act, or instruction used in the description of the present application should be construed as critical or essential to the present disclosure unless explicitly described as such. Also, as used herein, each of the indefinite articles "a" and "an" is intended to exclude more than one item. If only one item is intended, the terms "a single" or similar languages could be used. Furthermore, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A routing message delivery method applicable to a network node comprising:
   initiating a timer having a first timer value that is a non-zero positive number;
   forwarding a first routing message via a first path in response to receiving the first routing message before the timer having the first timer value expires, further comprising:
      resetting the timer as a second timer value in response to forwarding the first routing message before the timer having the first timer value expires, wherein the second timer value is less than the first timer value by $\delta$ and $\delta$ is a non-zero positive number; and
      forwarding a third routing message via a second path in response to receiving the third routing message before the timer having the second timer value expires;
   initiating a second routing message via the first path and the second path in response to not receiving the first routing message before the timer having the first timer value expires;
   constructing a current network topology comprising the first path and the second path; and
   updating the current network topology based on a latest routing message among the first routing message, the second routing message, and the third routing message.

2. The method of claim 1, wherein forwarding the first routing message comprising:
   receiving the first routing message comprising a first set of network node parameters and a first distance parameter;
   appending the first routing message with a second set of network node parameters and a second distance parameter; and
   forwarding the first routing message comprising the first set of network node parameters, the second set of network node parameters, the first distance parameter, and the second distance parameter.

3. The method of claim 2, wherein the first set of network node parameters and the second set of network node parameters comprising:
   a user number;
   an access point (AP) subnet address;
   a global positioning satellite (GPS) address; and
   a battery status.

4. The method of claim 1, wherein updating the current network topology based on the latest routing message among the first routing message, the second routing message, and the third routing message comprising:
   calculating multiple routing metrics based on a type of a target node, a battery status of the target node, a distance between the network node and the target node, and a user number; and
   evaluating an optimal path having a best routing metric to deliver at least one data packet.

5. The method of claim 4, wherein the node type is a weight associated with a Mobile Ad-hoc Network (MANET) relay or a delay and disruption tolerant network (DTN) relay.

6. The method of claim 1, wherein updating the current network topology based on the first path comprising:
updating a routing table comprising a User Space Routing Table and a Kernel Space Routing Table, wherein
the User Space Routing Table comprises:
the first path; and
a first metric associated with the first path and
the Kernel Space Routing Table comprises
a destination network node; and
a network interface number of the destination network node.

7. The method of claim 6 further comprising:
detecting a failure of another network node;
transmitting a first failure message to other neighboring nodes; and
forwarding a second failure message to other neighboring nodes.

8. The method of claim 7, further comprising:
removing the another network node associated with the failure from the User Space Routing Table and the Kernel Space Routing Table; and
updating the routing table to reflect changes associated with removing the another network node.

9. A network node comprising:
a timer, for initiating a timer having a first timer value that is a non-zero positive number;
a routing message forwarder, for forwarding a first routing message via a first path in response to receiving the first routing message before the timer having the first timer value expires, wherein the routing message forwarder is further configured for:
resetting the timer as a second timer value in response to forwarding the first routing message before the timer having the first timer value expires, wherein the second timer value is less than the first timer value by δ and δ is a non-zero positive number; and
forwarding a third routing message via a second path in response to receiving the third routing message before the timer having the second timer value expires;
a routing message initiating circuit, for initiating a second routing message via the first path and the second path in response to not receiving the first routing message before the timer having the first timer value expires; and
a routing table generator, for constructing a current network topology and updating the current network topology based on a latest routing message among the first routing message, the second routing message, and the third routing message.

10. The network node of claim 9 further comprising a transmitter and a receiver, and the routing message forwarder forwarding the first routing message comprising:
receiving via the receiver the first routing message comprising a first set of network node parameters and a first distance parameter;
appending the first routing message with a second set of network node parameters and a second distance parameter; and
forwarding via the transmitter the first routing message comprising the first set of network node parameters, the second set of network node parameters, the first distance parameter, and the second distance parameter.

11. The network node of claim 10, wherein the first set of network node parameters and the second set of network node parameters comprising:
a user number;
an access point (AP) subnet address;
a global positioning satellite (GPS) address; and
a battery status.

12. The network node of claim 9 further comprising a transmitter and routing metric evaluating circuit configured for:
calculating multiple routing metrics based on a type of a target node, a battery status of the target node, a distance between the network node and the target node, and a user number; and
forwarding via the transmitter at least one data packet via an optimal path having a best routing metric.

13. The network node of claim 12, wherein the node type is a weight associated with a Mobile Ad-hoc Network (MANET) relay or a delay and disruption tolerant network (DTN) relay.

14. The network node of claim 9, wherein routing table generator for updating the current network topology based on the latest routing message among the first routing message, the second routing message, and the third routing message comprising:
updating a routing table comprising a User Space Routing Table and a Kernel Space Routing Table, wherein
the User Space Routing Table comprises:
the first path; and
a first metric associated with the first path and
the Kernel Space Routing Table comprises
a destination network node; and
a network interface number of the destination network node.

15. The network node of claim 14 further comprising:
a link failure detection circuit for:
detecting a failure of another network node;
transmitting a first failure message to other neighboring nodes; and
forwarding a second failure message to other neighboring nodes.

16. The network node of claim 15, wherein the link failure detection circuit is further configured for:
removing the another network node associated with the failure from the User Space Routing Table and the Kernel Space Routing Table via the routing table generator; and
updating the routing table.

17. A communication network comprising
a first network node comprising:
a timer, for initiating a timer having a first timer value that is a non-zero positive number;
a routing message forwarder, for forwarding a first routing message via a first path in response to receiving the first routing message before the timer having the first timer value expires, the routing message forwarder further configured for:
resetting the timer as a second timer value in response to forwarding the first routing message before the timer having the first timer value expires, wherein the second timer value is less than the first timer value by δ and δ is a non-zero positive number; and
forwarding a third routing message via a second path in response to receiving the third routing message before the timer having the second timer value expires;

a routing message initiating circuit, for initiating a second routing message via the first path and the second path in response to not receiving the first routing message before the timer having the first timer value expires;

a routing table generator, for constructing a current network topology and updating the current network topology based on a latest routing message among the first routing message, the second routing message, and the third routing message;

a first wireless interface; and a second network node comprising:

a second wireless interface, for communicating with the first network node via the first wireless interface.

18. The communication network of claim 17, wherein the second network node further comprises:

a third wireless interface, for connecting to an internet.

19. The communication network of claim 18, wherein the second network node further comprises:

a fourth wireless interface, for providing a Wi-Fi service.

* * * * *